(12) United States Patent
Hsu

(10) Patent No.: US 7,866,238 B2
(45) Date of Patent: Jan. 11, 2011

(54) SAWING APPARATUS FOR CUTTING ROLLS OF WEB MATERIAL

(75) Inventor: Huang Pin Hsu, Taipei (TW)

(73) Assignee: Chan Li Machinery Co., Ltd. (TW)

( * ) Notice: Subject to any disclaimer, the term of this patent is extended or adjusted under 35 U.S.C. 154(b) by 631 days.

(21) Appl. No.: 11/472,963

(22) Filed: Jun. 22, 2006

(65) Prior Publication Data

US 2008/0017003 A1  Jan. 24, 2008

(51) Int. Cl.
- *B26D 7/02* (2006.01)
- *B26D 7/14* (2006.01)
- *B23D 47/04* (2006.01)
- *B26D 3/16* (2006.01)
- *B26D 7/06* (2006.01)

(52) U.S. Cl. .............................. 83/175; 83/17; 83/119; 83/176; 83/451; 83/459; 83/462; 83/466

(58) Field of Classification Search .................. 83/385, 83/17–21, 27, 107, 113, 118, 119, 175, 176, 83/282, 451, 459, 462, 466

See application file for complete search history.

(56) References Cited

U.S. PATENT DOCUMENTS

| | | | | | |
|---|---|---|---|---|---|
| 2,064,017 | A | * | 12/1936 | Leschen | 451/231 |
| 3,709,075 | A | * | 1/1973 | Goellner | 83/27 |
| 3,978,747 | A | * | 9/1976 | Lyon | 83/18 |
| 4,143,567 | A | * | 3/1979 | Kaiser et al. | 83/113 |
| 4,342,240 | A | * | 8/1982 | Gaiser et al. | 83/42 |
| 4,378,715 | A | * | 4/1983 | Kaiser et al. | 83/113 |
| 4,553,460 | A | * | 11/1985 | Stahl et al. | 83/113 |
| 5,038,647 | A | * | 8/1991 | Biagiotti | 83/155.1 |
| 5,755,147 | A | * | 5/1998 | Tsune | 83/277 |
| 6,532,851 | B2 | * | 3/2003 | Moss et al. | 83/466 |
| 2005/0217443 | A1 | * | 10/2005 | Matteis | 83/113 |

\* cited by examiner

*Primary Examiner*—Clark F. Dexter
(74) *Attorney, Agent, or Firm*—Baker & McKenzie, LLP; David I. Roche

(57) ABSTRACT

A sawing apparatus is implemented to cut rolls out of an elongated log. An in-feed conveyor pushes the log, and a braking system stops the log at a controlled position. A clamping system then holds the log in place while a saw blade travels to cut a roll out of the log. While the log is being cut, a bending pressure is applied on the log. The roll then is unloaded onto a discharge conveyor.

11 Claims, 12 Drawing Sheets

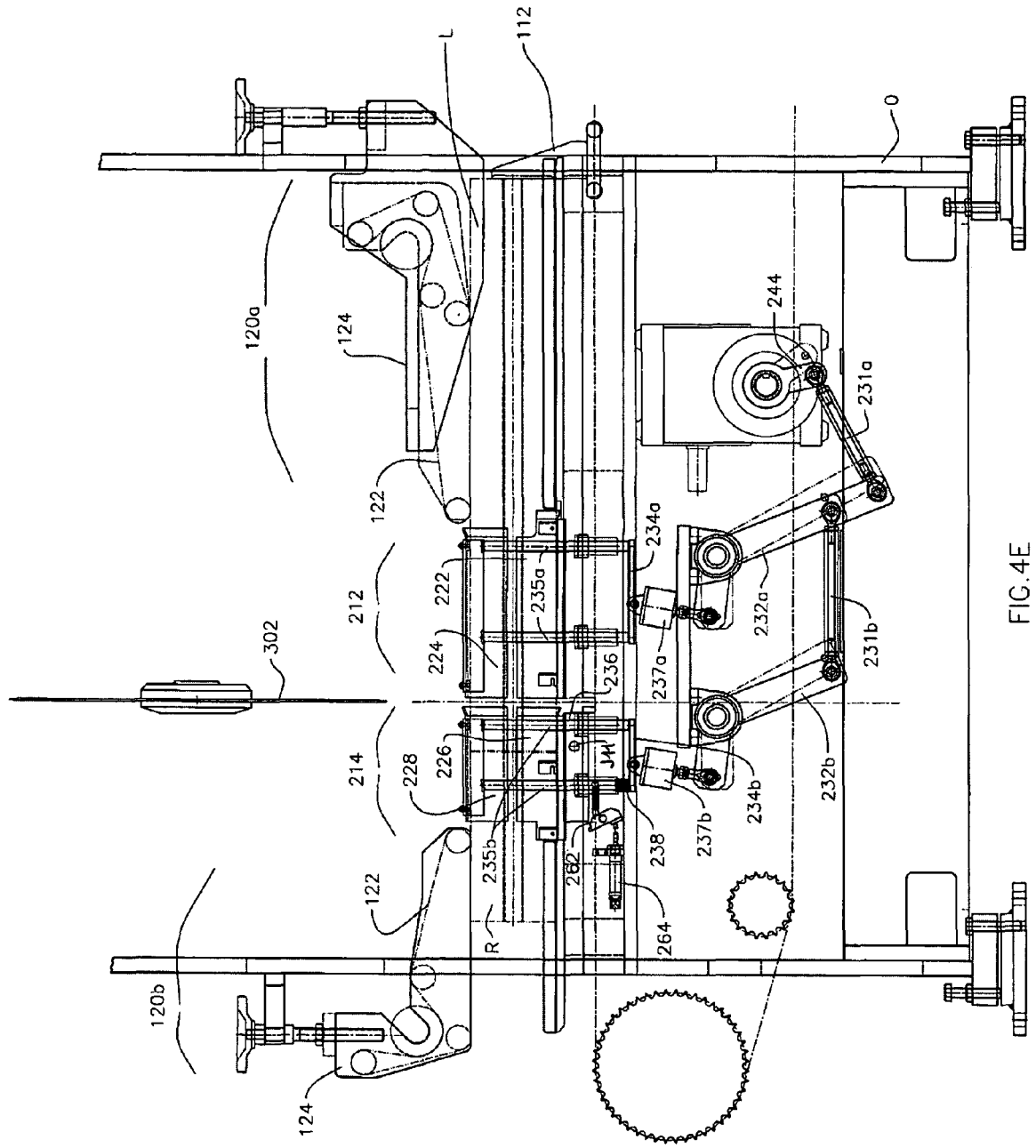

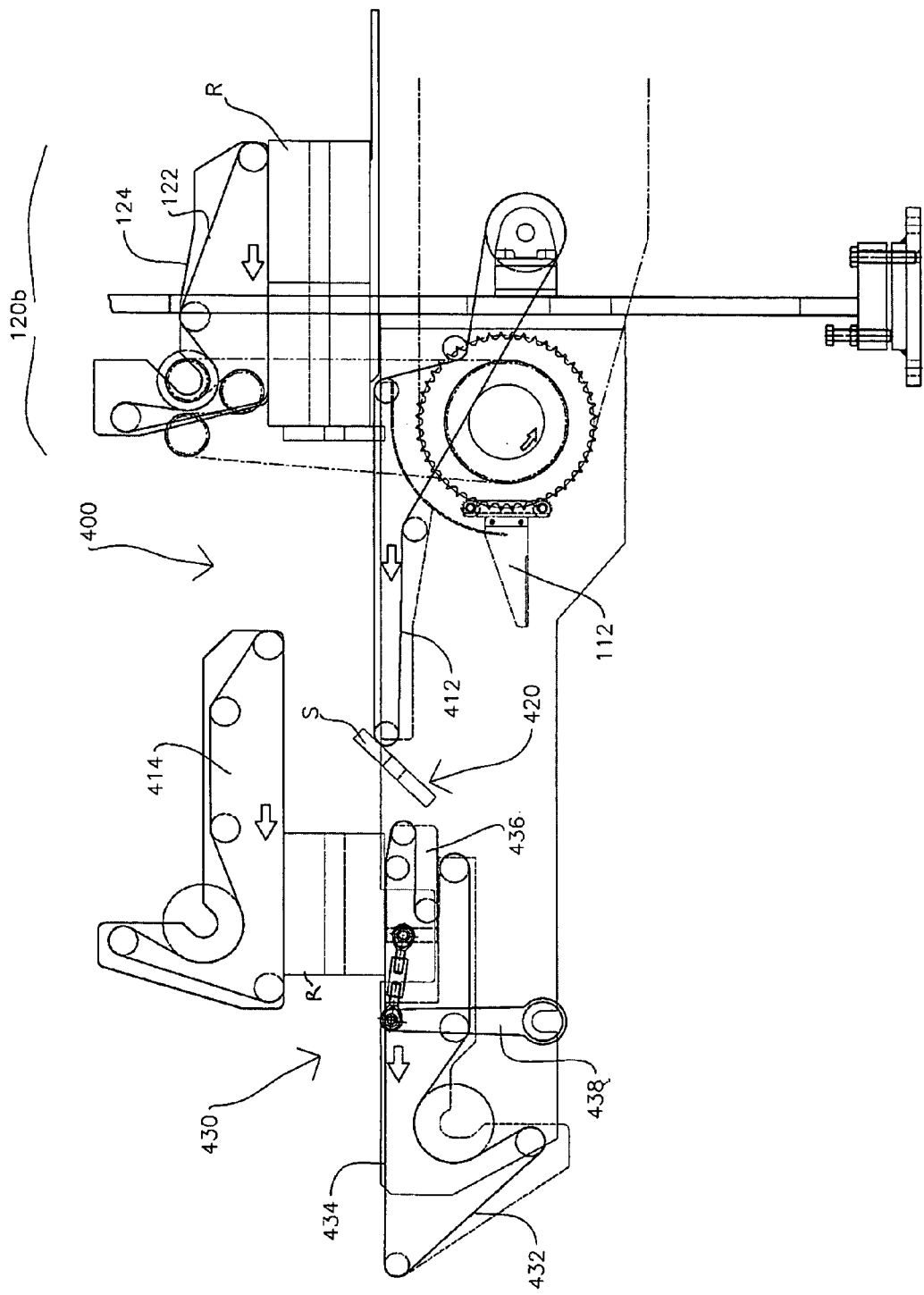

SAWING APPARATUS FOR CUTTING ROLLS OF WEB MATERIAL

FIELD OF THE INVENTION

The present invention generally relates to the manufacture of logs or rolls of a web material, and more particularly to a sawing apparatus and a process of cutting elongated logs of a web material into smaller rolls.

DESCRIPTION OF THE RELATED ART

Conventionally, the manufacture of rolls of toilet tissue, kitchen towels or like products requires a number of processing steps, including unwinding the web material from a log of a large diameter, rewinding it on a log of a smaller diameter, sealing a tail of the log, cutting the log into roll products of a smaller length suitable for consumer's use, and packaging the roll products.

The cutting operation to form rolls of a smaller length is usually conducted within a sawing apparatus that receives logs wound from an upstream rewinding machine. The construction of a sawing apparatus conventionally includes a saw blade rotated in orbit relative to an axis within a cutting plane transvers to a direction of feeding of an elongated log. A pushing paddle is used to convey by pushing a tail of one log, which thereby travels through the saw blade. Conventionally, the pushing paddle advances the log a predetermined length and then stops to position the log. A clamping system then is operated to hold the log in place while the saw blade cuts a roll out of the log. The clamping system then releases the log, and the pushing paddle advances again the log to proceed the next roll.

The sawing apparatus known in the prior art has some disadvantages which need improvement. For example, arresting the motion of the pushing paddle usually does not immediately stop the conveyance of the log. Indeed, owing to its own inertia, the log may slip a certain interval from the position where the pushing paddle stops. This positioning error of the log directly affects the length of each roll being cut out. If the length deviation for each roll is totaled over the entire log length, the resulting imprecision may constitute an undesirable material loss for each processed log.

Moreover, the fibrous characteristic of the web material may render the cutting through of the log less effective, particularly when the cutting edge of the saw blade is worn and becomes less sharp after a number of operating cycles.

Therefore, there is presently a need for a sawing apparatus that can accurately position an elongated log for cutting, and enhance the cutting of the saw blade in operation.

SUMMARY OF THE INVENTION

The present application describes a sawing apparatus and a process of cutting rolls from an elongated log of a web material.

According to one embodiment, the sawing apparatus comprises an in-feed conveyor for moving an elongated log of a web material along a processing direction, a braking system configured to contact with a surface of the log to controllably stop its course, a clamping system for holding the log in place, and a cutting unit including a saw blade movable to cut out a roll from the log.

In some embodiments of the sawing apparatus, the braking system includes a pressing belt configured to contact with a surface of the log in movement. In other embodiments, the pressing belt and the in-feed conveyor are synchronously driven. In some variant embodiments, the braking system is arranged to contact with the log upstream of the cutting unit and at least one roll cut out downstream of the cutting unit, respectively.

In some embodiments of the sawing apparatus, the clamping system includes at least one jaw assembly configured to hold the log in place. In other embodiments, the at least one jaw assembly includes at least one adjustable jaw movable to clamp and release one log. In some variations, the at least one adjustable jaw is driven in movement by one actuator. In other variations, the saw blade is driven in movement by the actuator of the at least one adjustable jaw to cut the log.

In some implementations of the invention, the at least one adjustable jaw is configured to tilt to an angle to apply a bending pressure on a portion of one log being held within the clamping system. In other implementations, the tilting of the at least one adjustable jaw is selectively disabled when one last roll is being cut out from the log. In some variations, the tilting of the at least one adjustable jaw is disabled by detecting when a tail of the log is proximate to the at least one jaw assembly.

In one variant embodiment of the invention, the clamping system may also include a second jaw assembly having a second adjustable jaw movable to clamp and release the log at an area away from the at least one jaw assembly. In some embodiments, the at least one adjustable jaw can be configured to tilt to an angle to apply a bending pressure on a portion of one log being clamped by the at least one adjustable jaw and the second adjustable jaw.

In other embodiments, the sawing apparatus comprises a discharge conveyor for moving cut rolls, and a transfer conveyor separated from the discharge conveyor by a gap. The discharge conveyor and the transfer conveyor are movable relative to each other to adjust the size of the gap for allowing the passage of a roll from the discharge conveyor to the transfer conveyor while dropping a scrap cut out of the log.

The application also describes a process for cutting small rolls from an elongated log of a web material. In one embodiment, the process comprises conveying an elongated log of a web material, braking the log to stop the log at a controlled position, clamping the log, and cutting a roll out of the log.

In some embodiments, conveying an elongated log of a web material includes pushing the log. In some variant embodiments, braking the log to stop the log at a controlled position includes performing a pressing contact with a surface of the log in movement.

In some embodiments, clamping the roll includes applying a bending pressure on a portion of the log. In some variations, applying a bending pressure on a portion of the log is performed while cutting a roll out of the log. In other variations, the applying of a bending pressure is selectively released during cutting a last roll out of the log.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

BRIEF DESCRIPTION OF THE DRAWINGS

FIGS. 4A through 4E are schematic views illustrating the operating process of a sawing apparatus for cutting a roll from an elongated log of a web material according to an embodiment of the invention;

FIGS. 6A and 6B are schematic views of a roll discharge mechanism implemented in a sawing apparatus for cutting rolls of a web material according to an embodiment of the invention.

DETAILED DESCRIPTION OF THE EMBODIMENTS

Figure 1:
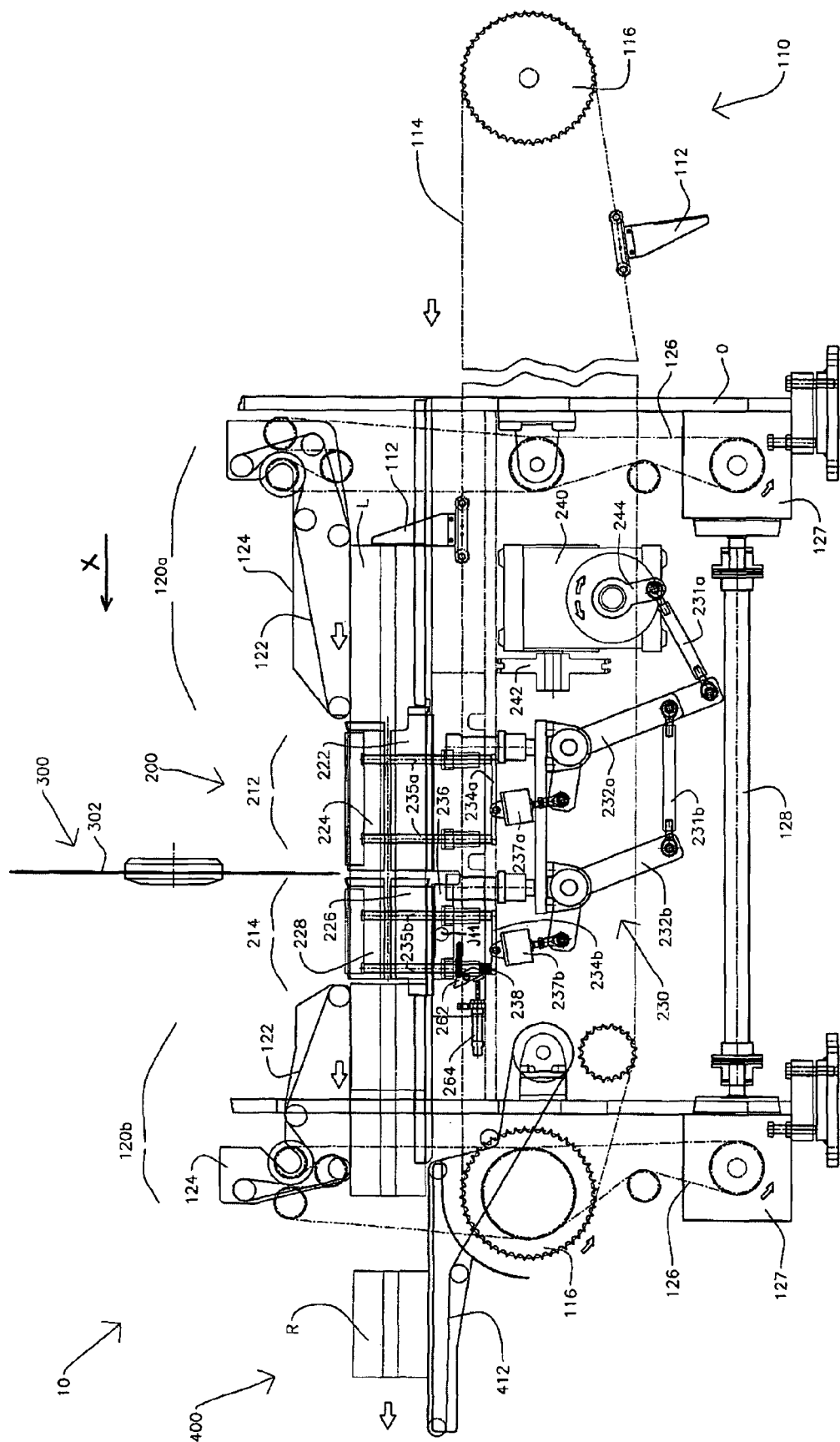
FIG. 1 is a schematic front view of a sawing apparatus for cutting rolls of a web material according to an embodiment of the invention.

The present application describes a sawing apparatus and a process of cutting small rolls from an elongated log of a web material. The web material can be tissue paper or any kinds of flexible materials that can be wound and processed into logs. In the drawings, similar reference numerals designate like elements unless otherwise described.

FIG. 1 is a schematic view showing the construction of a sawing apparatus for cutting rolls of a web material according to an embodiment of the invention. Reference number 10 generally designates the sawing apparatus, which includes an in-feed conveyor 110, a braking system comprised of braking units 120a and 120b, a clamping system 200, a cutting unit 300, and a roll discharge mechanism 400. The in-feed conveyor 110 feeds an elongated log L to be cut into smaller rolls of a predetermined length through the clamping system 200 and the cutting unit 300. The clamping system 200 holds the log L in place as the cutting unit 300 proceeds to cut the log L. Once one roll is cut out, the clamping system 200 releases the log L and the cut roll. The log L then advances again for the next roll cutting, and the cut-out roll continues and is discharged towards the discharge mechanism 400.

The in-feed conveyor 110 includes a pushing paddle 112 running along a processing axis X to push an elongated log L of a web material along a guiding track through the clamping unit 200 and the cutting unit 300. In the illustrated embodiment, the pushing paddle 112 is affixed to a continuous driver chain 114 movable through driving wheels 116 driven by an actuator, which can exemplary be a servomotor (not shown).

As shown in FIG. 1, each braking unit 120a, 120b of the braking system includes a continuous pressing belt 122 mounted to a supporting bracket 124. The height of the bracket 124 relative to the track supporting the log L is adjustable so that the belt 122 exerts a suitable pressure against a lateral surface of the log L being currently conveyed. The material of the belt 122 may be chosen to achieve a gripping contact with the web material of the log L. Such material may be a rubber material, for example. According to the illustrated embodiment, the pressing belt 122 of each braking unit 120a, 120b is driven through a toothed belt 126, gear box 127 and joint shaft 128 by the same servomotor (not shown) driving the movement of the pushing paddle 112. The movements of the braking system and in-feed conveyor thus are synchronized to advance and stop the log L at controlled positions. In particular, when the pushing paddle 112 stops pushing the log L, the pressing contact between the pressing belt 122 and the log L acts against the inertia of the log L to effectively brake and stop the course of the log L for accurately positioning it relative to the clamping system 200 and cutting unit 300.

Figure 2:
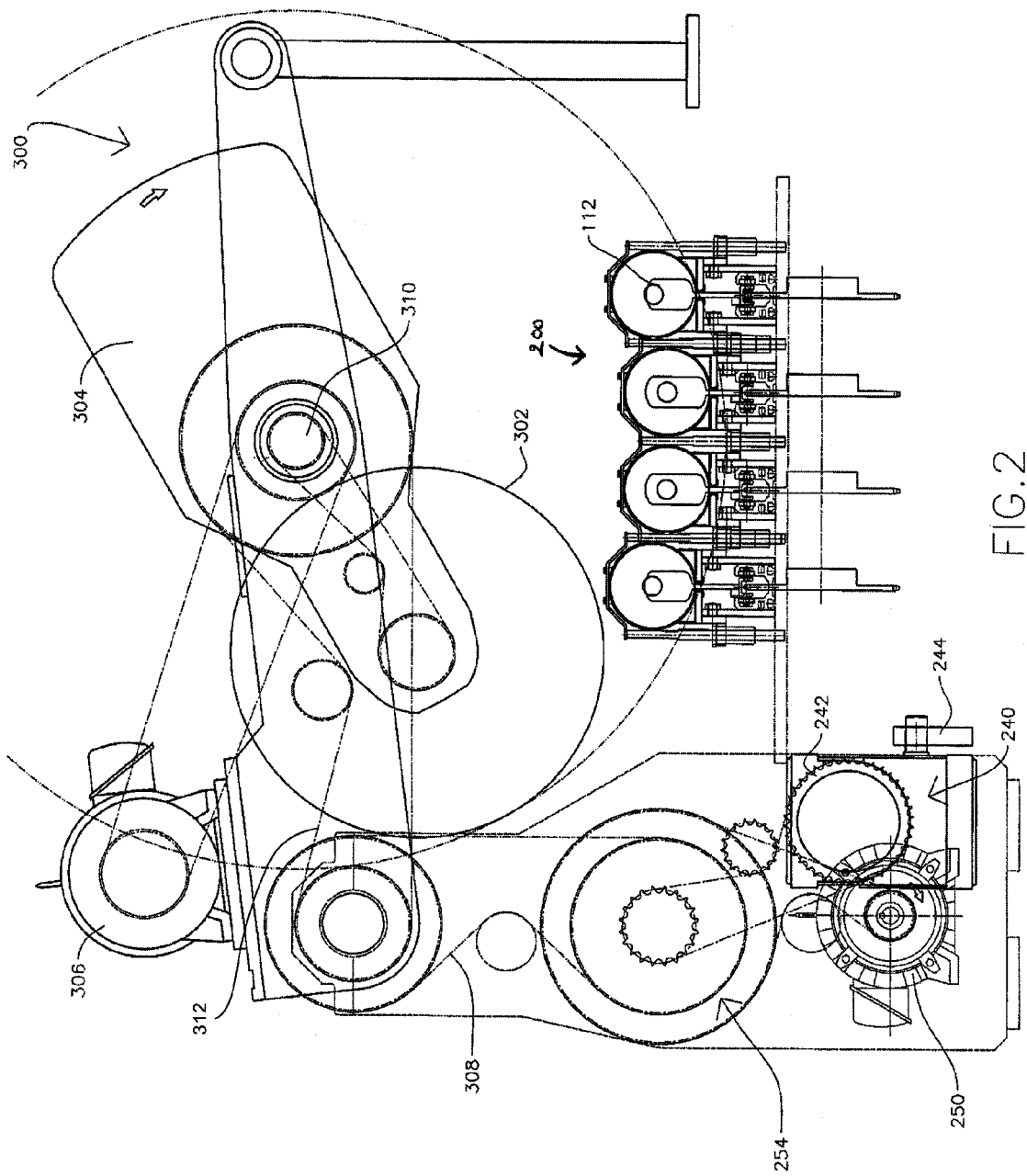
FIG. 2 is a schematic side view of a sawing apparatus for cutting rolls of a web material according to an embodiment of the invention.

Referring to FIGS. 1 and 2, the clamping system 200 includes two jaw assemblies 212 and 214 aligned along the axis X, and separated from each other with a gap. Each jaw assembly respectively includes a fixed jaw and an adjustable jaw movable relative to the fixed jaw to clamp and unclamp an elongated log L placed between the fixed and adjustable jaws. Reference numbers 222 and 224 respectively designate the fixed and adjustable jaws of the first jaw assembly 212, and reference numbers 226 and 228 respectively designate the fixed and adjustable jaws of the second jaw assembly 214. The fixed 222, 226 and adjustable jaws 224, 228 of each jaw assembly 212, 214 include curved concave surfaces fitting with the shape of the log L. The fixed jaws 222 and 226 are affixed to a machine frame 0, and include axial slots (not shown) for the passage of the pushing paddle 112 pushing a log L in.

Referring to FIGS. 1 and 2, the adjustable jaws 224 and 228 are assembled with a kinematic structure 230 that connects to a crankshaft 244 of an indexing system 240 driven by an actuator 250. The actuator 250 can be, for example, an inverter motor. A torque output from the actuator 250 is transmitted through a transmission chain 254 to an input toothed wheel 242 of the indexing system 240, which converts it into a swing movement of the crankshaft 244.

Figure 3:
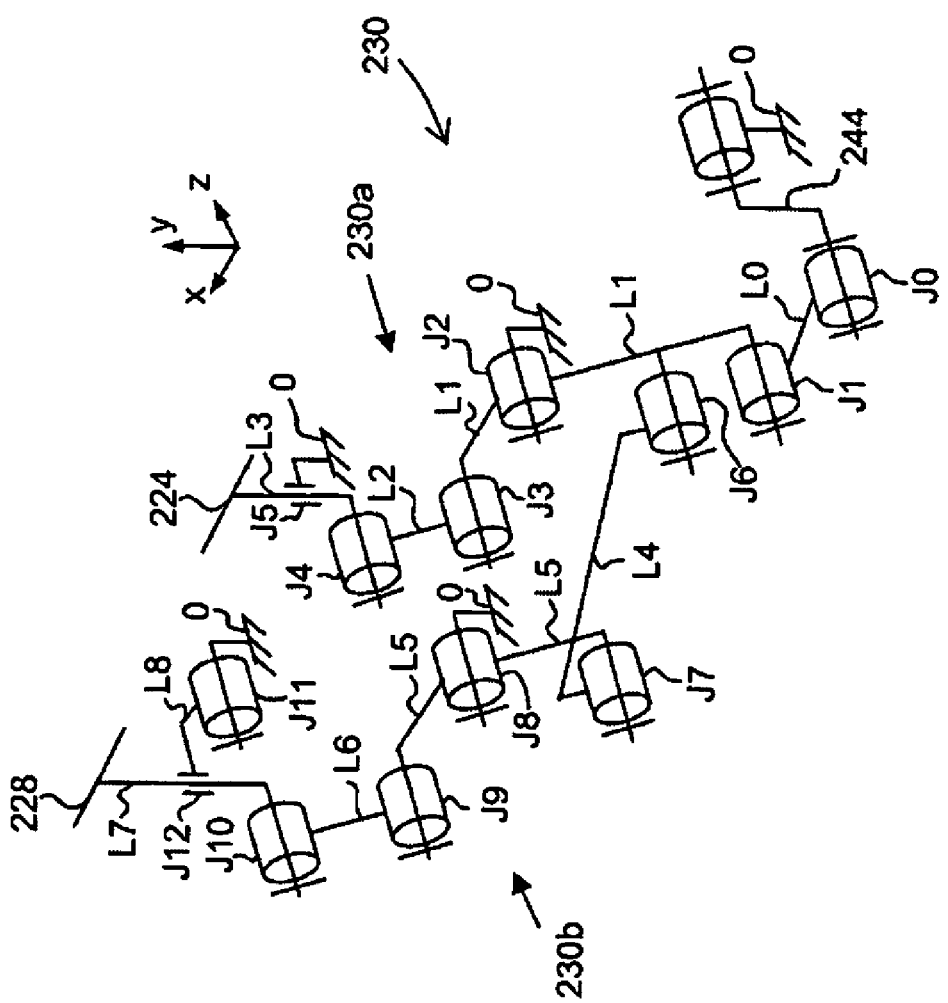
FIG. 3 is a schematic diagram of a kinematic structure of a log clamping system implemented in a sawing apparatus for cutting rolls of a web material according to an embodiment of the invention.

FIG. 3 is a schematic representation of a kinematic structure implemented in a clamping system according to an embodiment of the invention. The kinematic structure 230 comprises two kinematic chains 230a and 230b configured to convert back-and-forth movements of the crankshaft 244 to substantially vertical clamping and unclamping actions of the adjustable jaws 224 and 228. A first kinematic chain 230a connecting to the first adjustable jaw 224 includes a link member L0 connected with the crankshaft 244 at pivot joint J0, a link member L1 supported by the machine frame 0 at pivot joint J2 and connected with the link member L0 at pivot joint J1, and a link member L2 respectively connecting the link member L1 at pivot joint J3 and a link member L3 through pivot joint J4. The link member L3 is mounted in for translational motion relative to the machine frame 0 through joint J5, and secures with the adjustable jaw 224.

The second kinematic chain 230b connecting to the second adjustable jaw 228 includes a link member L5 supported by the machine frame 0 at pivot joint JS, a link member L6 connected with the link member L5 through a pivot joint J9, and a link member L7 secured with the second adjustable jaw 228 and connected with the link member L6 through a pivot joint J10. The link member L7 is also mounted for translational motion relative to a link member L8 through joint J12. The link member L8 is supported by the machine frame 0 at pivot joint J11, which is eccentric from the translation axis of the link member L7. The first and second kinematic chains 230a and 230b connect to each other through a link member L4, which respectively connects through a pivot joint J6 with the link member L1 and through a pivot joint J7 with the link member LS.

Referring to FIGS. 1 and 2 in conjunction with FIG. 3, the link members L0 and L4 are exemplary elongated beams 231a and 231b mounted with pivot connections at joints J0, J6 and J7. Each of the link members L1 and L5 can be a generally L-shaped arm 232a, 232b having two beams intersecting with an angle at the pivot connections of joint J2 and J8. Each of the link members L3 and L7 is formed in a fork structure including rods 235a and 235b braced with plates 234a and 234b, respectively. The rods 235a secured with the fu'st adjustable jaw 224 are mounted for translational motion relative to the machine frame 0 affixing the first fixed jaw 222. The rods 235b secured with the second adjustable jaw 228 are mounted for translational motion relative to a tilting base 236 configured as the link member L8. The tilting base 236 is mounted to the machine frame 0 at the pivot joint J11, which is offset from the translation axis of at least one of the rods 235b. Spring cylinders 237a and 237b, respectively forming the link members L2 and L6, connect to the plates 234a and 234b at pivot joints J4 and J10, and to an end of the arms 232a and 232b at pivot joints J3 and J9, respectively. The spring cylinders 237a and 237b provide elasticity to the kinematic chains 230a and 230b, so that the actuated adjustable jaws 224 and 228 can apply suitable clamping pressures for different log diameters.

Referring again to FIG. 2, the cutting unit 300 includes a saw blade 302 carried at an end of a rotary arm 304. The saw blade 302 exemplary has a disk shape with a sharp edge, and spins on itself driven by the actuation of a saw motor 306. A toothed belt 308 transmits a torque output from the actuator 250 through a gear transmission chain 312 to an axle 310 of the rotary arm 304, which thereby moves the saw blade 302 in orbit relative to the axle 310. The same actuator 250 is used to drive the adjustable jaws 224 and 228 and the orbit of the saw blade 302, so that the clamping and unclamping actions of the adjustable jaws 224 and 228 are correlated with the angular position of the saw blade 302 orbiting relative to the axle 310.

Figure 4A:
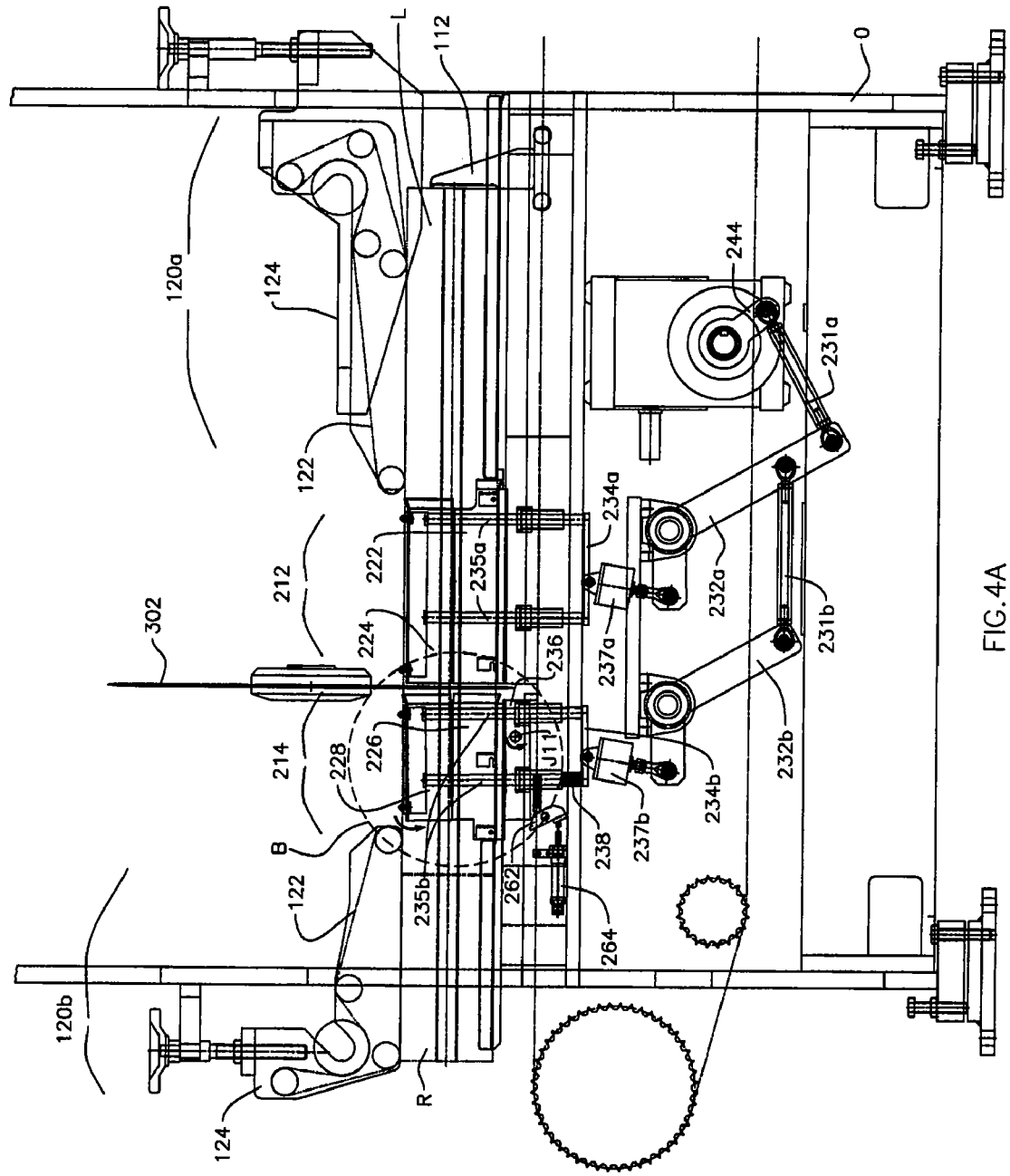

FIGS. 4A through FIG. 4E are schematic views illustrating different stages in the operation of a sawing apparatus according to an embodiment of the invention. For the purpose of simplification, the illustration of operating elements in FIGS. 4A through 4E has been simplified to render the description clearer. In FIG. 4A, the pushing paddle 112 has completed a course of a predetermined length of roll to cut, and stopped to position the log L inside the clamping system. Because the surface of the log L is in pressing contact with the pressing belt 122 of the braking system 120a, the log L effectively slows down and stops as the belt 122 brakes and stops synchronously with the pushing paddle 112. The crankshaft 244 then rotates an angle to draw the adjustable jaws 224 and 228 toward the fixed jaws 222 and 226, and thereby clamp the log L in place.

Figure 7:
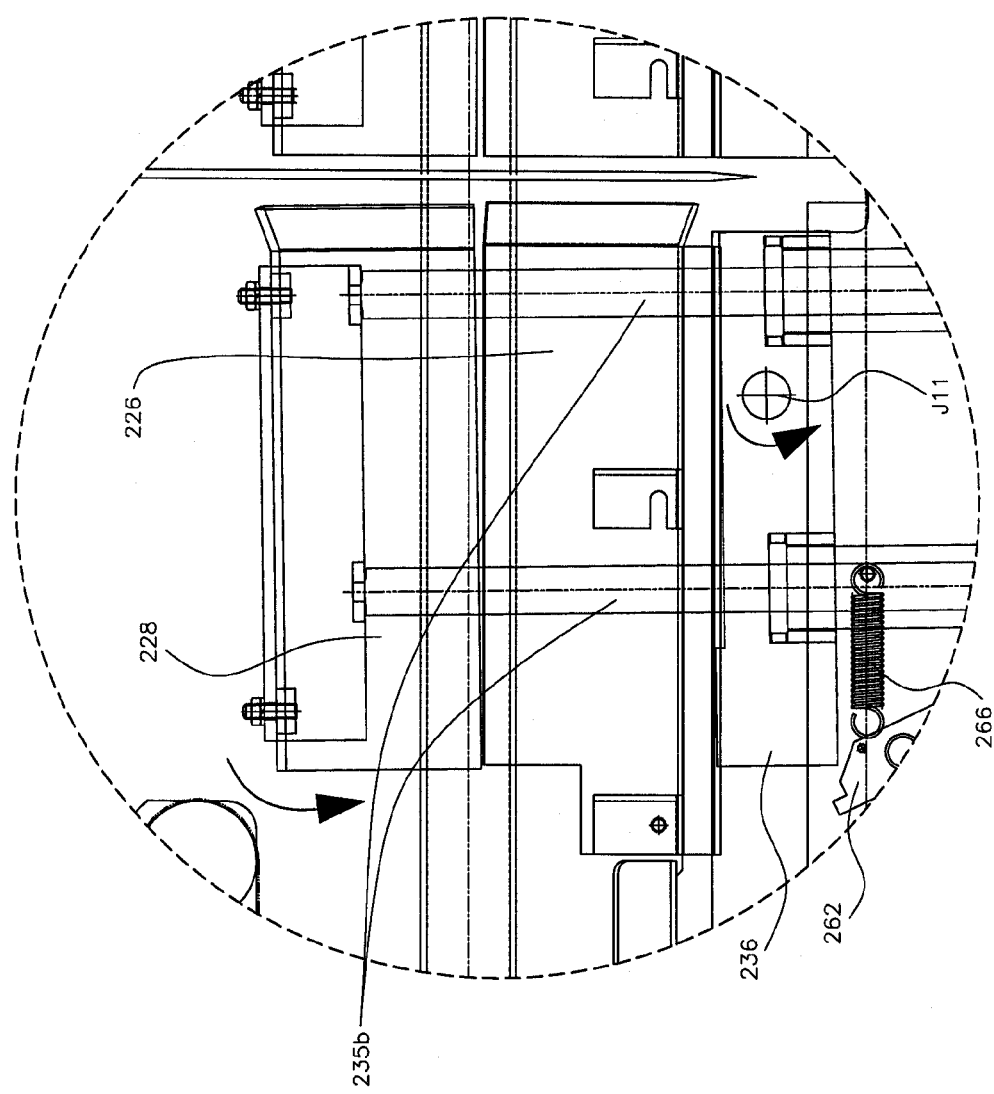
FIG. 7 is an enlarged view of portion B of FIG. 4A.

As the crankshaft 244 rotates in the clamping direction, a drawing force exerted by the spring cylinder 237b on the plate 234b is converted into a tilting force relative to the pivot joint J11. Accordingly, a bending pressure is applied on the log L by the tilted second adjustable jaw 228 as the log L is tightly clamped by the first and second adjustable jaws 224 and 228. FIG. 7 is an enlarged view of portion B of FIG. 4A that more clearly illustrates the second adjustable jaw 228 in the tilted position by rotation relative to the pivot joint J11.

The tilting force is created by biasing the direction of the drawing force applied by the spring cylinder 237b relative to the pivot joint J11. To this purpose, appropriate design configurations may exemplary include inclining the axis of the spring cylinder 237b relative to a translation axis of the rods 235b, offsetting the position of the pivot joint J10 relative to a sliding axis of the adjustable jaw and/or relative to the position of the pivot joint J11 (FIG. 3), or a combination of these arrangements. A person skilled in the art will readily appreciate that other design schemes for transmitting an actuating force to the adjustable jaws may also be appropriate to create a tilting force on the adjustable jaw of the second jaw assembly.

Figure 4B:
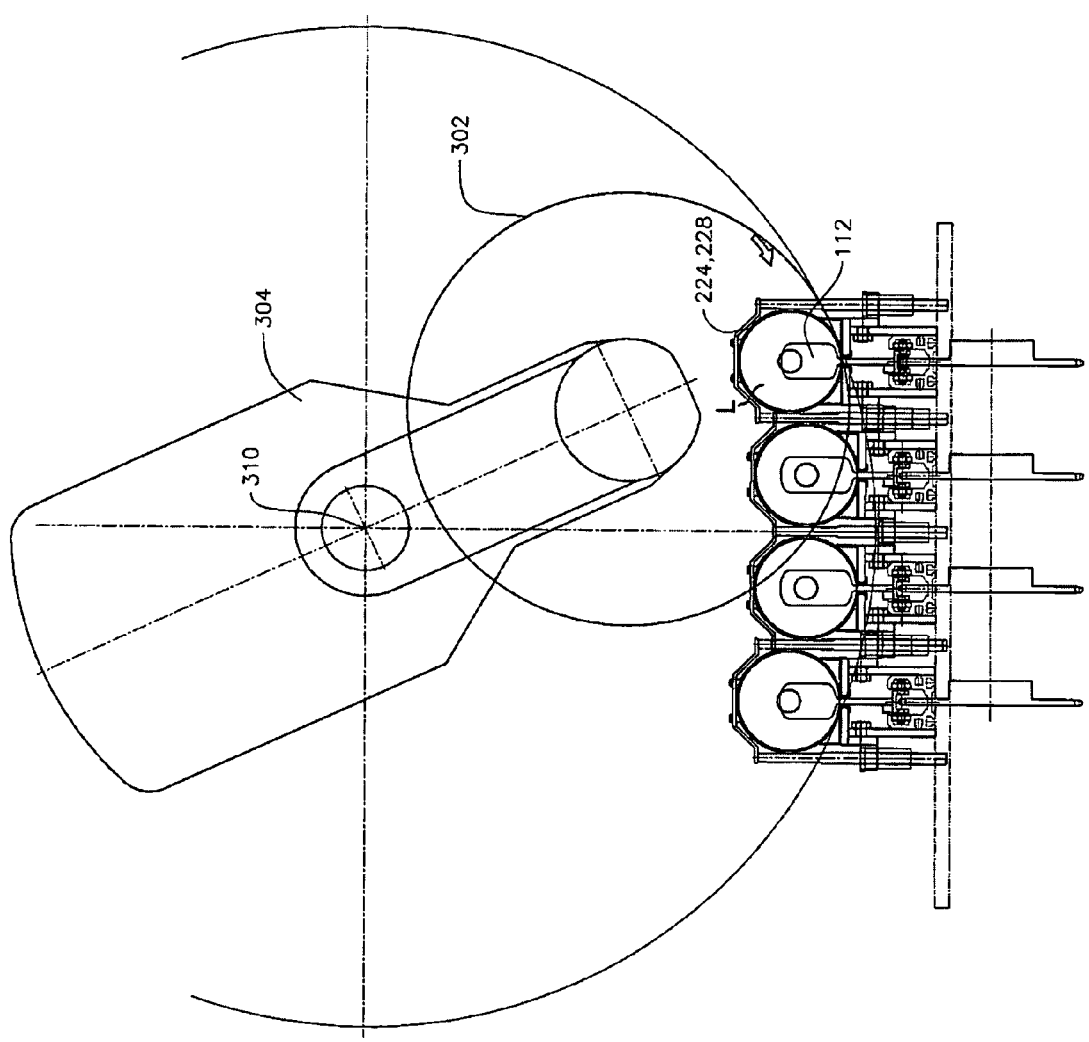
Figure 4C:
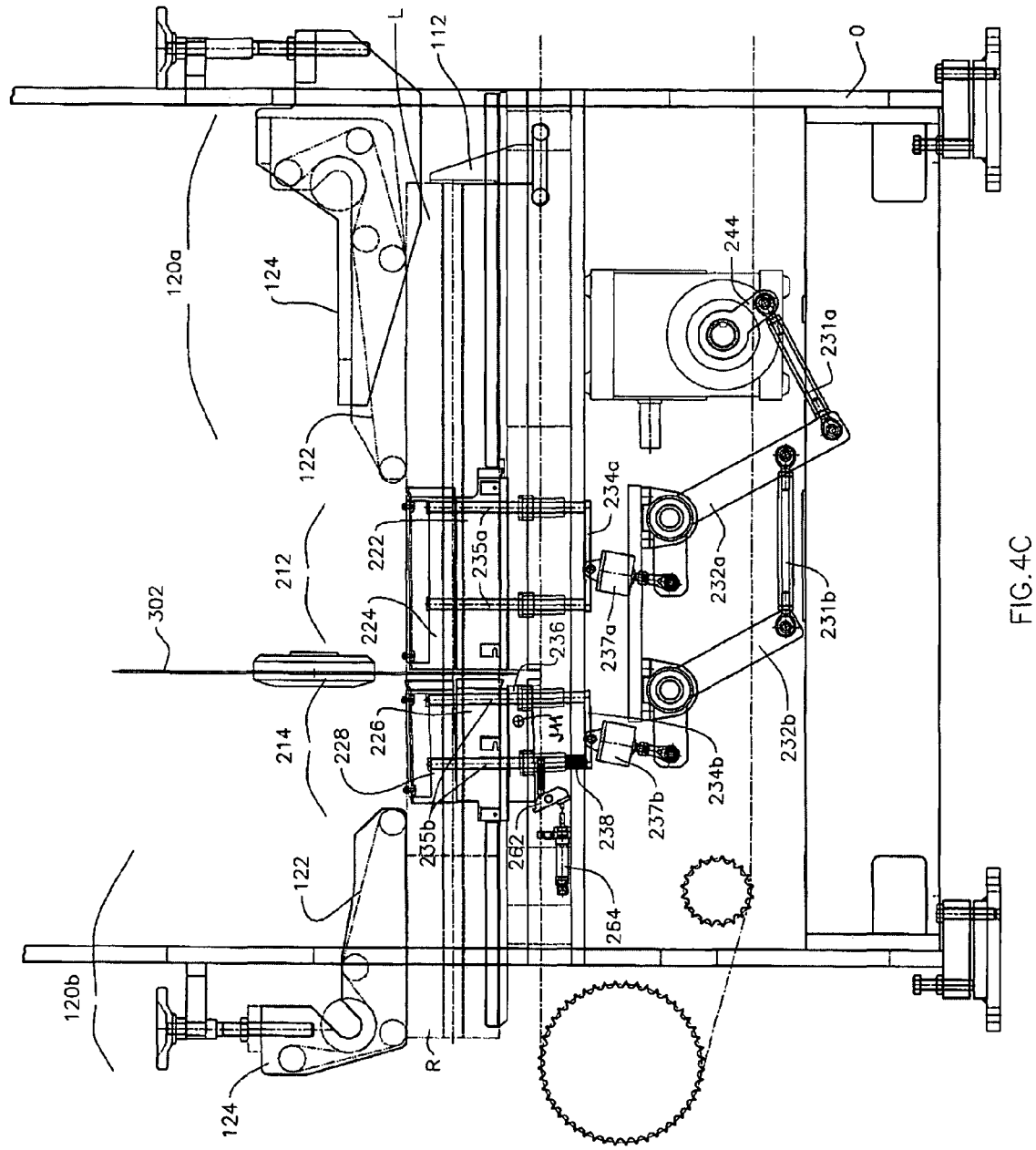

Referring to FIGS. 4B and 4C, the jaws assemblies 212 and 214 clamp the log L, and the saw blade 302 travels through the gap between the first and second jaw assemblies 212 and 214 to cut the log L. As the saw blade 302 advances and cuts the clamped log L, a roll portion clamped by the second adjustable jaw 228 gradually separates from the portion of the log L being clamped by the first adjustable jaw 224. As a result, the tilting force applied at the second adjustable jaw 228 is released, and the second adjustable jaw 228 tilts to apply a bending pressure on the log. Accordingly, a shearing stress is generated generally tangential to the cutting section of the log traversed by the saw blade 302. As a result, frictional contacts at the cutting section between the fibrous web material making up the log and the saw blade 302 can be reduced, and the cutting penetration of the saw blade 302 through the web material is promoted.

Figure 4D:
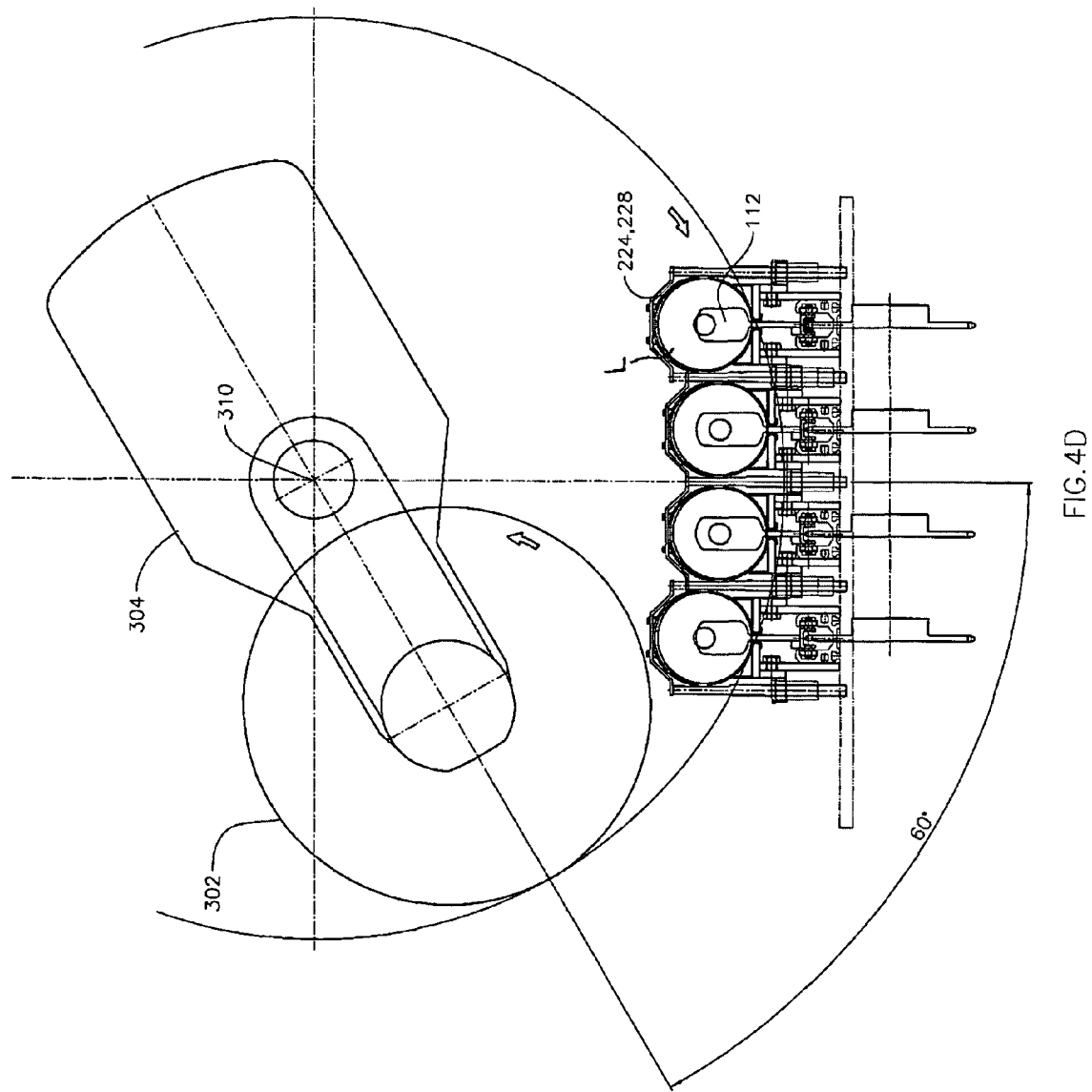

Referring to FIGS. 4D and 4E, as the saw blade 302 leaves the area of the clamped log L, which may exemplary correspond to an angular portion of about 120° in the orbit path of the saw blade 302, the crankshaft 244 driven by the actuator 250 reversely rotates so that the spring cylinders 237a and 237b apply a pushing force to open the adjustable jaws 224 and 228. Within the second jaw assembly 214, a compressive spring 238 mounted on the axis of one rod 235b is loaded by the application of the pushing force from the spring cylinder 237b, which creates a reverse force that realigns the second adjustable jaw 228 parallel with the second fixed jaw 226 while the second adjustable jaw 228 is opening. Once the jaw assemblies 212 and 214 have released the log L and the cut-out roll R, the pushing paddle 112 starts advancing to push the log L and roll R forward. The braking unit 120b downstream of the cutting unit 300 permits to control the progress of the cut rolls after the cutting unit 300. The rolls R can be unloaded on a discharge conveyor for further subsequent processing as described later.

Figure 5:
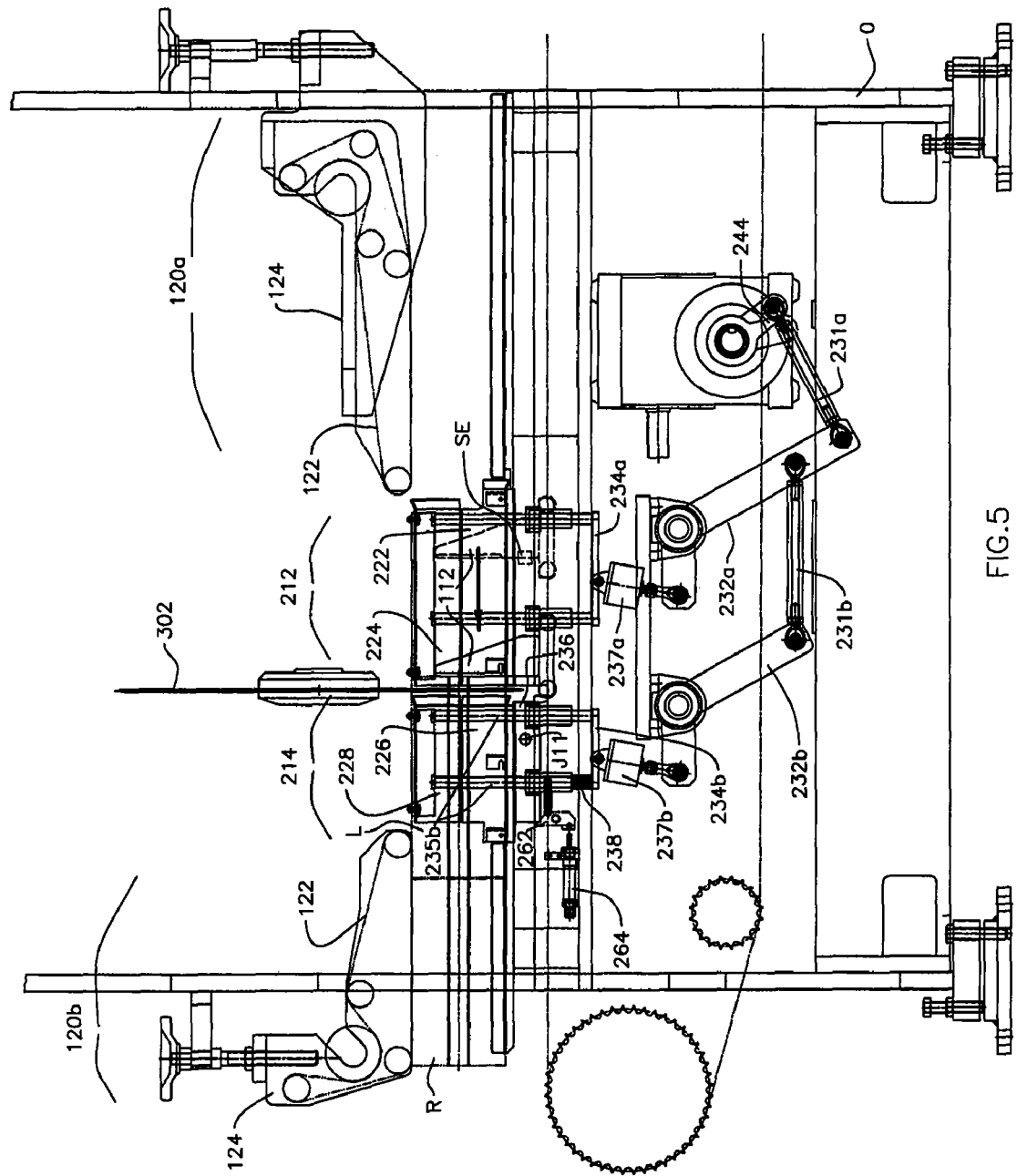
FIG. 5 is a schematic view illustrating the operation process of a sawing apparatus for cutting a last roll according to an embodiment of the invention.

FIG. 5 is a schematic view of a mechanism implemented in a sawing apparatus for cutting a tail scrap of a log of web material according to an embodiment of the invention. Since the total length of an elongated log may not be equal to an exact multiple of a roll length, the cutting of a last roll from a log generally leaves a tail scrap of a length shorter than a roll length. In FIG. 5, the pushing paddle 112 has advanced and positioned the remaining log L inside the clamping system. For this last cutting phase, the course of the pushing paddle 112 may advance the tail of the remaining log L substantially within the first jaw assembly 212, and the front of the log L may extend beyond the clamping system. In this case, the log L can be effectively arrested in place inside the clamping system with the braking unit 120b downstream of the clamping system, which presses against the front of the log to arrest its course.

During the cutting of a last roll, an inclination of the second adjustable jaw 228 may not be desirable because the first adjustable jaw 224 holds a small portion of the log tail compared to the portion held by the second adjustable jaw 228, and inclining the second adjustable jaw 228 may adversely deviate the log and bias the cutting section. To disable the tilt of the second adjustable jaw 228, a sensor (not shown) may be used to detect a passage of the pushing paddle 112 pushing the log for the last cutting. In an implementation, this sensor may be placed, for example, adjacent to the first jaw assembly 212. Referring to FIG. 5, the sensor detecting a last cutting phase outputs a signal to change the configuration of a latch 262 from an unblocking position to a blocking position.

In the illustrated embodiment, the latch 262 is exemplary a rotary plate inclinable by actuation of an air cylinder 264 and connected to an extension spring 266. In the unblocking position, the air cylinder 264 in extension biases the latch 262 to incline away from an edge of the tilting base 236 (as shown in FIGS. 4A through 4E), and thereby creates a clearance allowing the tilting base 236 to tilt the second adjustable jaw 228. In the blocking position (as shown in FIG. 5), the air cylinder 264 receiving the signal outputted from the sensor retracts and the latch 262 is pulled back by the extension spring to lie substantially in abutment against the tilting base 236, which thus is blocked to disable the tilting of the second adjustable jaw 228.

Referring to FIG. 5, when the crankshaft 244 rotates to draw the adjustable jaws 224 and 228 toward the fixed jaws 222 and 226 and clamp the log L, the latch 262 in the blocking position prevents tilting of the adjustable jaw 228 that accordingly clamps parallel with the fixed jaw 226. The saw blade 302 then passes to cut the last roll and define a tail scrap. Once the clamping system opens to release the last roll and the tail scrap, the pushing paddle 112 pushes the tail scrap and the last roll out of the clamping system to be unloaded on the discharge conveyor.

Figure 6A:
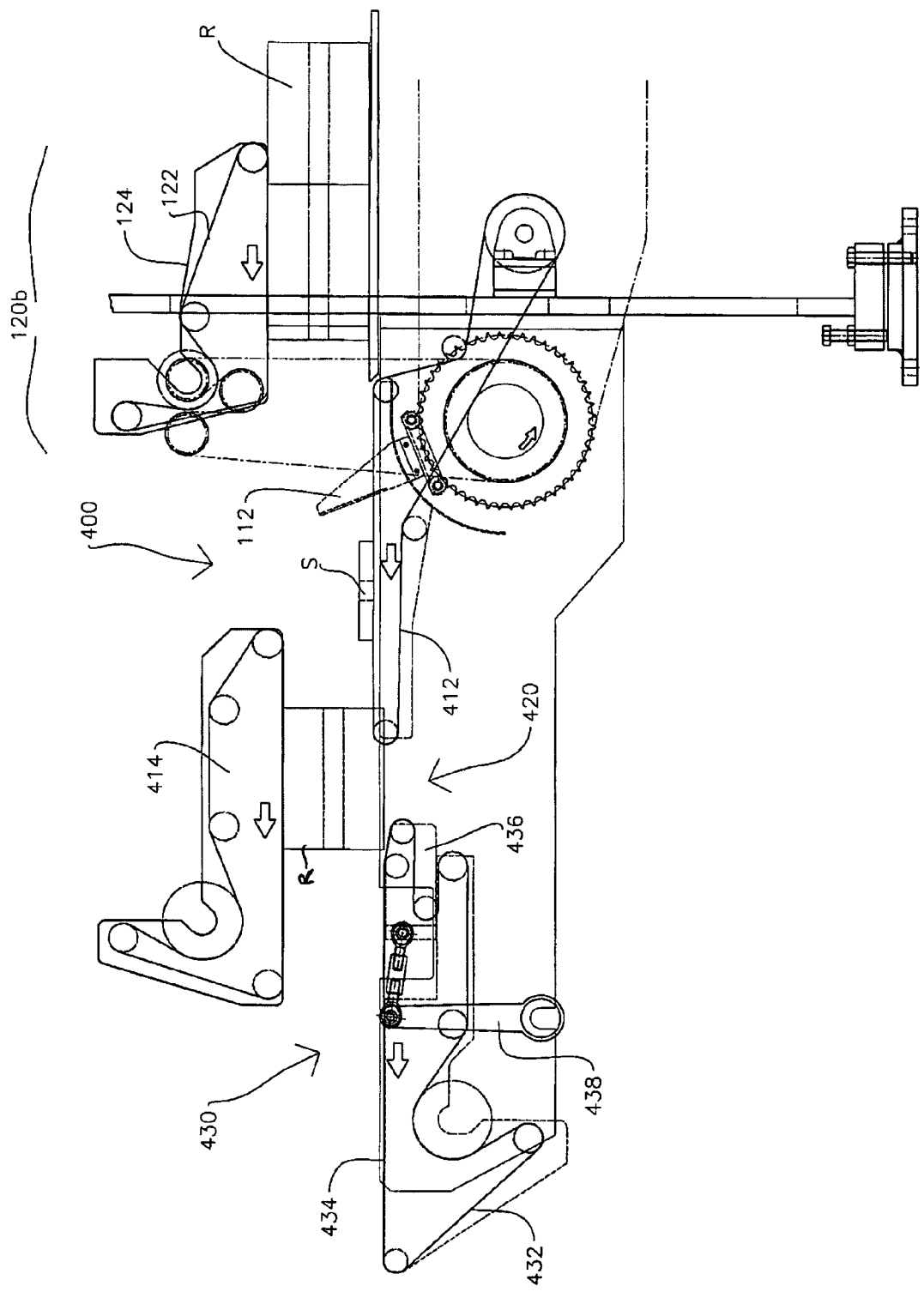

FIGS. 6A and 6B are schematic views illustrating a mechanism for discharging cut rolls according to an embodiment of the invention. Once the rolls R are cut out, the pushing paddle 112 pushes the rolls R that are transferred onto a discharge conveyor 412. In one embodiment, the discharge conveyor 412 can be two parallel conveyor belts which carry the rolls R away from the pushing paddle 112 at a faster speed so as to disengage the rolls R from the turning area where the pushing paddle 112 returns back to an in-feed position. An upper conveyor belt 414 may also be arranged above the discharge conveyor 412 to ensure the rolls R are correctly held and conveyed during the discharge operation.

As shown in FIGS. 6A and 6B, the upper conveyor belt 414 bridges over a gap 420 separating the discharge conveyor 412 from a next transfer conveyor 430. The transfer conveyor 430 includes a conveyor belt 432 driven around driver wheels respectively arranged on a frame 434 and an adjusting base 436. The adjusting base 436 is placed at an end of the transfer conveyor 430 facing the discharge conveyor 412, and is connected to an actuator arm 438 configured to movably adjust the position of the base 436 so as to either increase or reduce the size of the gap 420. As a result, the gap 420 can be adjusted to allow the passage of a roll R of a greater size, and drop front and tail scraps S cut out of the log and having a smaller size.

Many variant implementations of the sawing apparatus would be apparent to a person skilled in the art of machinery from the teaching of the present invention. For example, the first jaw assembly may also be configured to operatively tilt the first adjustable jaw on one side opposite to the second adjustable jaw to promote log cutting, which may be implemented with a construction similar to that of the second adjustable jaw described above. In other embodiments, the direction of the bending pressure applied on the log by the adjustable jaw may be varied according to the approaching direction of the saw blade relative to the clamping system. Additionally, the sawing apparatus may be suitable for processing either core-wound logs or coreless wound logs by changing the shape of the fixed and adjustable jaws.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A sawing apparatus for cutting rolls of a web material, comprising:
    an in-feed conveyor for moving an elongated log of a web material along a processing direction;
    a braking system configured to contact with a surface of the log to controllably stop a course of the log;
    a clamping system for holding the log in place; and
    a cutting unit including a saw blade movable to cut along a cutting path to cut out a roll from the log;
    wherein the clamping system comprises:
        a first jaw assembly;
        a second jaw assembly spaced apart from the first jaw assembly, the second jaw assembly disposed on an opposite side of the cutting path relative to the first jaw assembly, wherein the second jaw assembly includes a pivotal link operable to cause a rotation movement of a portion of the second jaw assembly for applying a tilting force on a clamped portion of the log; and
        a latch operable to selectively block movement of the pivotal link for disabling the rotation movement of the portion of the second jaw assembly.

2. The sawing apparatus according to claim 1 wherein the second jaw assembly includes one fixed jaw and one adjustable jaw movable relative to the fixed jaw to clamp and release one log.

3. The sawing apparatus according to claim 2, wherein the adjustable jaw is driven in movement by one actuator.

4. The sawing apparatus according to claim 3, wherein the saw blade is driven in movement by the actuator to cut the log.

5. The sawing apparatus according to claim 2, wherein the rotation movement is performed by the adjustable jaw relative to the fixed jaw.

6. The sawing apparatus according to claim 1, wherein the latch is movable to come in contact with the pivotal link for disabling the rotation movement of the portion of the second jaw assembly.

7. A sawing apparatus for cutting rolls of a web material, comprising:
    an in-feed conveyor for moving an elongated log of a web material along a processing direction;
    a clamping system for holding the log in place; and
    a cutting unit including a saw blade movable to cut along a cutting path to cut out a roll from the log;
    wherein the clamping system comprises:
        a first jaw assembly;
        a second jaw assembly disposed spaced apart from the first jaw assembly along the processing direction, the second jaw assembly disposed on an opposite side of the cutting path relative to the first jaw assembly, wherein the second jaw assembly includes a pivotal link operable to cause a rotation movement of a portion of the second jaw assembly for applying a tilting force on the log when the second jaw assembly performs a clamping action; and
        a latch operable to selectively block movement of the pivotal link for disabling the rotation movement of the portion of the second jaw assembly.

8. The sawing apparatus according to claim 7, wherein the second jaw assembly includes one fixed jaw and one adjustable jaw movable relative to the fixed jaw.

9. The sawing apparatus according to claim 8, wherein the rotation movement is performed by the adjustable jaw relative to the fixed jaw.

10. The sawing apparatus according to claim 8, wherein the adjustable jaw is driven in movement by one actuator.

11. The sawing apparatus according to claim 7, wherein the latch is movable to come in contact with the pivotal link for disabling the rotation movement of the portion of the second jaw assembly.

* * * * *